United States Patent [19]

Gilroy

[11] 4,443,961
[45] Apr. 24, 1984

[54] DISPLAY HOLDER FOR GROCERY TYPE CARTS

[76] Inventor: Edward J. Gilroy, 623-5th St. E., Saskatoon, Saskatchewan, Canada, S7H 1G4

[21] Appl. No.: 459,047

[22] Filed: Jan. 19, 1983

[30] Foreign Application Priority Data

Feb. 9, 1982 [CA] Canada .................................. 395830

[51] Int. Cl.³ .............................................. G09F 3/00
[52] U.S. Cl. ........................................ 40/308; 40/374; 40/366
[58] Field of Search ........... 40/308, 20 R, 374, 158 B, 40/366

[56] References Cited

U.S. PATENT DOCUMENTS 1,465,244 8/1923 Hager ...................................... 40/374
2,888,761 6/1959 Miller ...................................... 40/308

*Primary Examiner*—Robert Peshock
*Assistant Examiner*—Cary E. Stoner
*Attorney, Agent, or Firm*—Stanley G. Ade

[57] ABSTRACT

A transparent panel assembly consists of an upper and lower plate defining a space therebetween. It is secured to the cart and extends across the space between the transverse push rod and the upper transverse rod or bar of the rear side of the cart body. Printed advertisements or notices etc. may be detachably inserted within the space or spaces between the upper and lower panels, visible to the shopper pushing the cart. Clamps extend around the push bar and are secured to the adjacent edge of the panel holding this edge adjacent the underside of the push bar and further clamps extend around the other transverse rod and engage the underside of the other edge of the panel which rests upon the upper transverse rod for support. The sheet or sheets of display material carrying the advertisements or notices, extend slightly from the panel under the push bar where it is shielded yet permitting easy access for removal and replacement purposes.

12 Claims, 6 Drawing Figures

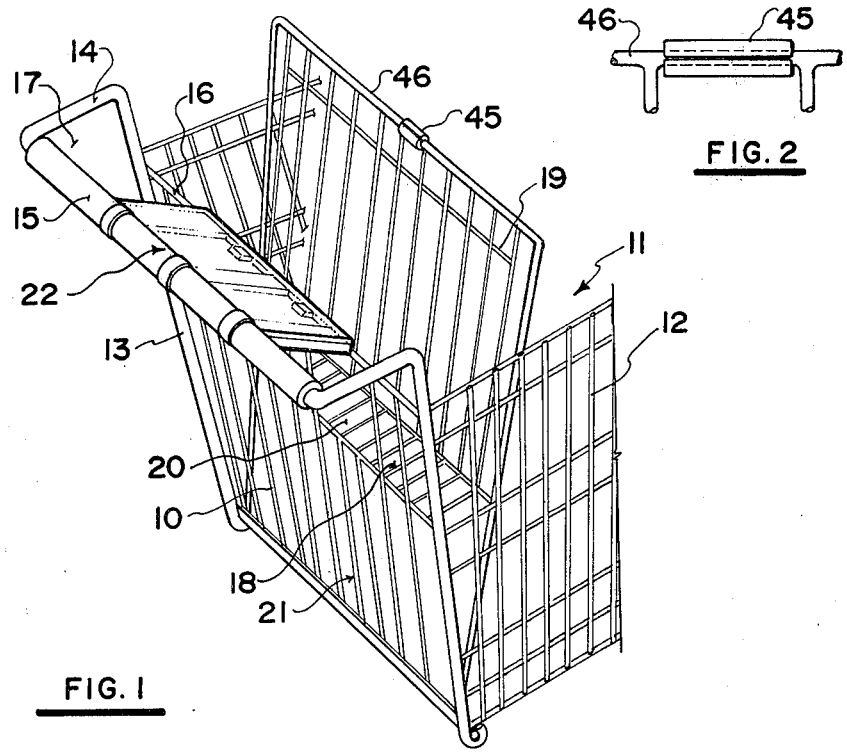
FIG. 1
FIG. 2
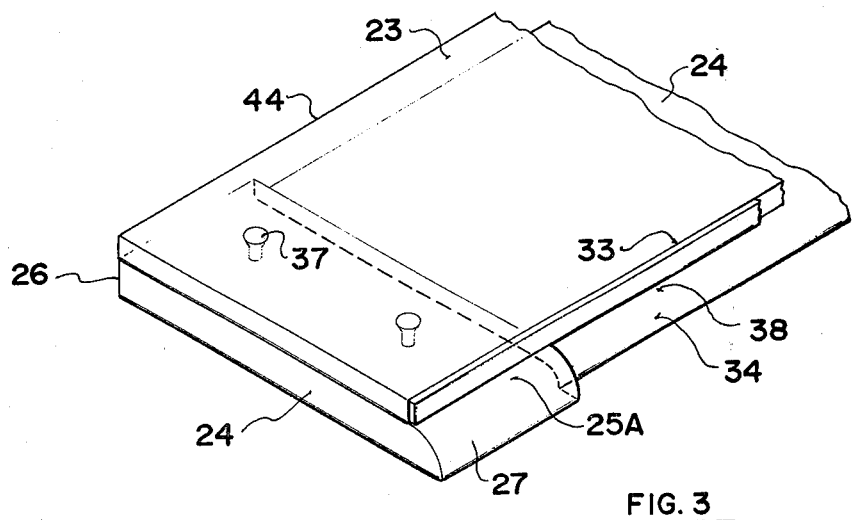
FIG. 3

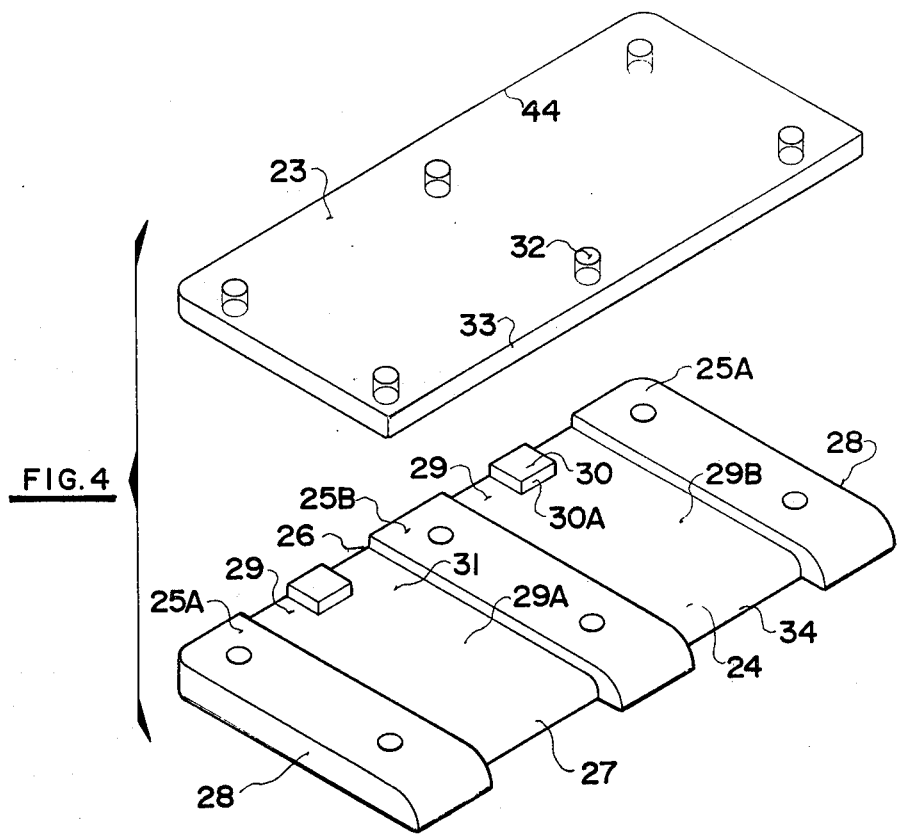
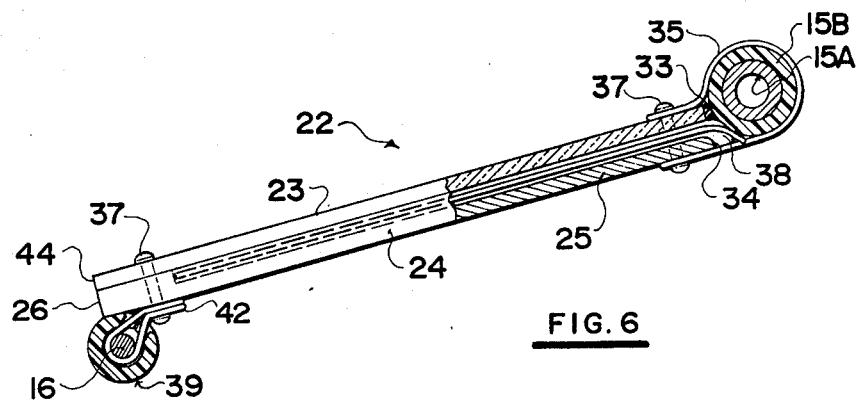

DISPLAY HOLDER FOR GROCERY TYPE CARTS

BACKGROUND OF THE INVENTION

This invention relates to new and useful improvements in display holders, particularly display holders adapted to be secured in the space between the push bar or rod and the upper transverse rod of a grocery cart body so that notices enclosed therein are readily seen by the shopper.

It is desirable, particularly in grocery stores and the like, to bring to the attention of the shopper, daily specials, shopping information, notices to improve consumer and management relations and the like and these are often broadcast over a loud-speaker system which can be irritating to some shoppers so that the entire effect is sometimes negated.

Notices can be displayed on gondolas or merchandise displays but these are only seen by shoppers who happen to pass thereby.

SUMMARY OF THE INVENTION

The present device provides a readily available display space which is seen by the shopper while pushing the cart inasmuch as it is situated between the push bar and the rear of the cart body and between the ends of the push bar where the hands are located.

In accordance with the invention there is provided a display holder for grocery carts and the like which include a transverse push bar and an upper transverse rod at the rear of the cart body spaced and parallel to the push bar; said display holder comprising in combination a substantially rectangular panel assembly including an upper side and a lower side defining at least one relatively thin recess therebetween opening out onto one longitudinal side of the panel assembly for detachably retaining display means therein, at least the upper side being transparent over the relatively thin recess, means to secure said panel assembly by the one longitudinal side thereof to the push bar of the associated grocery cart and means to secure said panel assembly by the other longitudinal side thereof, to the upper transverse rod at the rear of the cart body.

Another advantage of the invention is to provide a device of the character herewithin described in which the display notice is readily and easily removed and replaced.

Another advantage of the invention is to provide a display holder in which a plurality of messages can be displayed and which can be changed from time to time readily and easily.

A yet further advantage of the invention is to provide a display holder which can be secured to existing grocery carts without modification to the cart.

A yet further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a fragmentary isometric view of the handle end of a push cart showing the invention installed therein.

FIG. 2 is a fragmentary front elevation of a shock absorber for the folding infant seat portion.

FIG. 3 is a fragmentary isometric view of the panel assembly per se enlarged with respect to FIG. 1.

FIG. 4 is an isometric exploded view of the panel assembly enlarged with respect to FIG. 1.

FIG. 6 is an end elevation of the panel assembly attached to the cart members shown in cross section and enlarged with respect to FIG. 1.

In the drawings like characters of reference indicate corresponding parts in the different figures.

DETAILED DESCRIPTION

Figure 5:
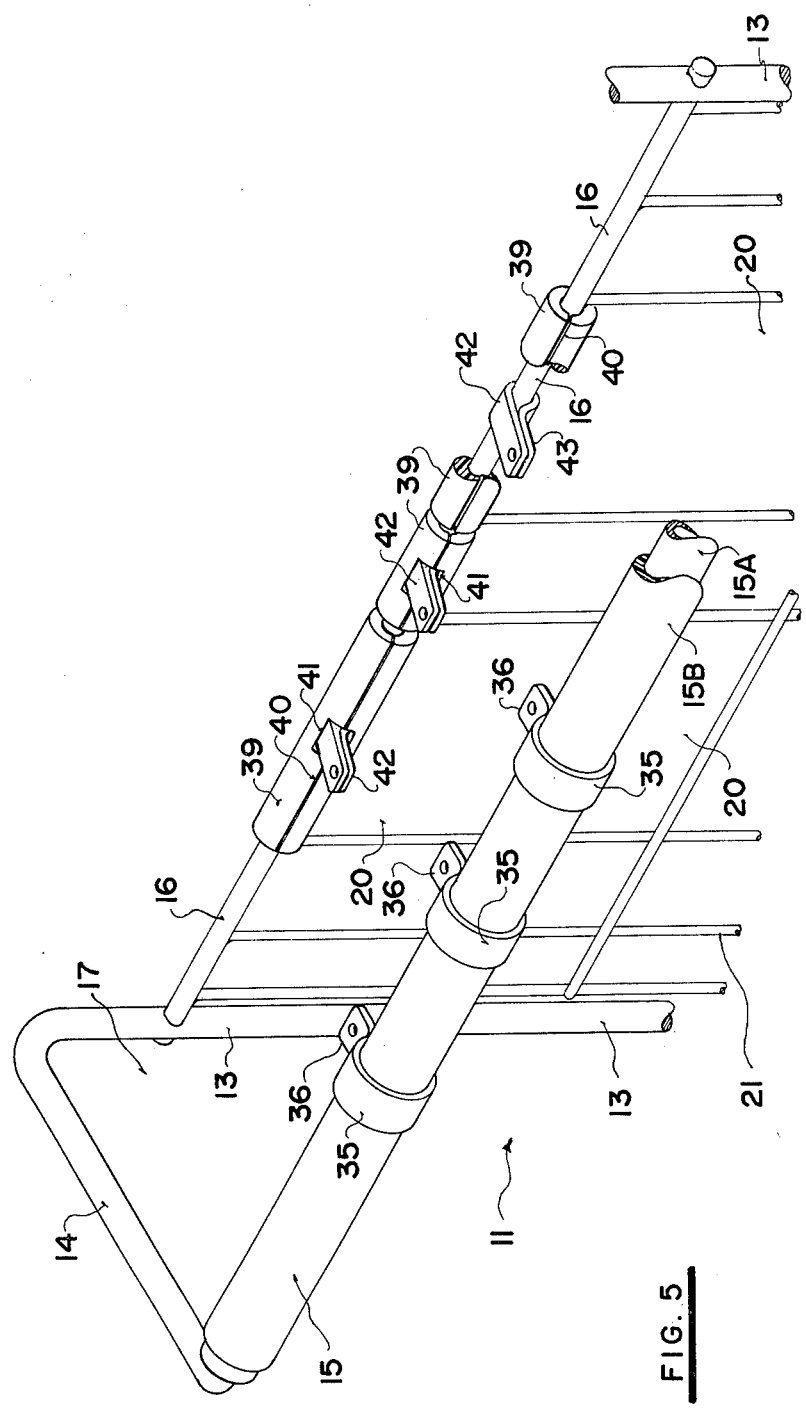
FIG. 5 is a fragmentary isometric view of the handle end of a grocery cart showing the clamps for holding the panel assembly.

Proceeding therefore to describe the invention in detail, reference should first be made to FIG. 1 which shows the rear side area 10 of a conventional grocery cart collectively designated 11. It includes the wire type cart body 12 and a pair of upwardly extending side frame members 13 which are angulated rearwardly at the upper ends thereof as indicated by reference character 14. A conventional push bar 15 extends between the ends of the portions 14 and normally consists of a tube 15A covered with a plastic sleeve 15B (see FIG. 6). The upper rear transverse rod 16 of the cart body also extends between the members 13, forwardly of the bar 15 and in parallel spaced relationship thereto thus defining a space or area 17 therebetween.

Conventionally, a pivoted infant's seat is provided including a base 18 and a front support panel assembly 19 with spaces 20 being provided each side of the rear wall 21, for the infant's legs, all of which is conventional.

The invention collectively designated 22 consists of a substantially rectangular display holder including an upper rectangular panel 23 and a lower rectangular panel 24. The upper rectangular panel is substantially planar on the upper and lower surfaces and is transparent at least over display areas defined in the lower panel 24.

The lower panel is provided with spacer portions 25 extending between the rear longitudinally extending edge or side 26 and the front longitudinally extending edge or side 27. In the present embodiment, there are two outer spacers 25A adjacent the ends 28 of the panel and one central spacer 25B situated intermediate the end spacers 25A thus defining a pair of recesses 29 therebetween extending between the longitudinal edges 26 and 27 so that when the upper panel 23 is secured upon the spacers as will hereinafter be described, the display areas are defined between the spacers 25A and 25B and between the upper and lower panel surfaces.

Stop members 30 also extend upwardly from the surface 31 of the base panel adjacent the rear longitudinal edge 26 thereof so that when the upper panel 23 is secured in position, the recesses not only open out onto the front longitudinal edge 27 but also upon the rear longitudinal edge 26 upon each side of the stopper members 30 which are of a similar thickness to the spacers 25A and 25B. It will be noted that matching apertures 32 extend through the upper panel 23 and the lower panel 24, the purpose of which will hereinafter be described.

The front longitudinal edge 27 of the lowermost panel 24, extends beyond the front longitudinal edge 33 of the upper panel, when the two panels are secured together as will hereinafter be described and this extending portion specifically designated 34, is bevelled or chamfered outwardly and downwardly at least between the spacers 25, as clearly shown in FIG. 3, the purpose of which will hereinafter become apparent.

Means are provided to secure the assembled display holder, within the area 17 and between the push bar 15 and the upper transverse rod 16 and reference should be made to FIG. 5 in this regard.

A plurality of open ended clamps 35 are engaged around the push bar 15 in spaced apart relationship with the open jaws 36 facing the rod 16. The upper panel 23 is engaged over the lower panel 24 with the aperture 32 in matching relationship and the longitudinally extending side 27 and 33 are engaged between the jaws 36 of the clamps 35 whereupon bolts or rivets 37 are engaged through the apertures in the clamp jaws 36 and through the apertures 32 in the upper and lower panels thus clamping the holder between these clamps 36. It is desired the clamps be shaped so that the longitudinally extending sides 33 and 27 of the display holder rest against the side of the push bar 15 so that the recess openings 38 between the upper and lower panels, are shielded by the push bar.

Resilient rubber or plastic spacers 39 are provided with split walls 40 so that they can be engaged over the transverse rod 16 as shown in FIG. 5. These spacers are apertured as at 41 and clamps 42 engage around the rod with the jaws 43 extending through the apertures 41 and these clamps and spacers are positioned along the upper transverse rod 16 so that the apertured jaws register with the corresponding apertures 32 through the upper and lower panels of the display holder. It is desirable that the longitudinal edges 26 and 44 of the two panels rest upon the spacers 39 surrounding the bar 16 in order to give support to the display panel. Under these circumstances both jaws 43 of the clamps 42 engage the underside of the lower panel 24 with the pop rivets or nut and bolt assemblies extending through the aperture jaws and through the panels 23 and 24 to hold the panel assembly firmly in position across the space 17.

It is of course necessary that the upper panel be transparent at least over the recesses 29 and in fact it is preferable that the entire display holder be made from transparent plastic.

When installed, two display areas 29A and 29B are provided comprised of the relatively thin recesses defined between the upper and lower panels 23 and 24 and various notices can be engaged within these recesses with the insertion distance being controlled by the front edges 30A of the stop members 30. It is preferable that the size of the display notice be such that when installed against the stop members 30, the front edge 33 (see FIG. 6) extends from the holder just under the push bar 15 so that it is shielded by the push bar against inadvertent displacement but is also readily accessible for removal and replacement by authorized personnel. The downwardly curved bevel 34 facilitates insertion of the sheet into the recess or recesses.

It is desirable that a small resilient split sleeve type shock absorber 45 be engaged around the center of the upper bar 46 of the infant seat back 19 so that when it is in the closed position, it does not damage the upper panel 23 against which it engages when closed either by the shopper or by personnel when "tunneling" carts for storage.

Authorized personnel can insert or remove the displays while the carts are parked in the store cart area or while the carts are tunneled. The plastic protects the display notices from the elements when carts are left outdoors or in market parking lots.

Although the drawings and description define upper and lower panels with apertures 32 formed therein, nevertheless it will be appreciated that these can be drilled in situ as desired.

The display notices can be used for many purposes and the following is but a sampling of the uses and advantages of the device.

1. Improved Consumer and Management Relations

There will be less questions between consumer and cashier or management, regarding the price of special item displayed on the market shelves, as some time happens. With today's computerized pricing, price tags are sometimes located below or above the item displayed, making it difficult for the consumer to choose the special item. This may be avoided if the item is described on the display notice or card.

The specially advertised items may be printed on the display card along with the prices and as many as 48 items may be displayed on one or two notices.

Various seasonal and special day greetings, such as Christmas, Mother's Day, etc., can be directed to the shopper, e.g. the special day greeting can be inserted in one side of the holder while the other side can display the store items.

2. In-Store Specials and everyday items overlooked by Consumer

These items are overlooked by the consumer on many occasions—the shopper may be in a hurry, or may feel restricted in the shopping time he or she has because of the complexity and variety of items on display.

3. Items and produce would move more quickly

Advertised specials or everyday items, whether using in-store window displays, TV or newspaper ads, are forgotten all too quickly by the consumer. Even when in the store, specials are overlooked unless there is a continual reminder of these items. With the display holder the consumer cannot forget—there is a continual reminder of items from the moment he or she enters the store and uses the cart until the cart and items are received at the check out counter.

4. Movement of Merchandise

The holder assists in the movement of merchandise and this would prove to be a real benefit to market managers.

5. Change to Metric

With today's possible change over to metric, the display holder has been adapted so as to provide space to display metric equivalents on each side of the plexiglass display surface along with the regular store advertisements. Consumers may check metric, Imperial or U.S. equivalents at a glance, and compare, giving the consumers an added benefit, and thereby making a more satisfied customer.

6. Shopper Control

With the device being used on the grocery carts, shoppers can be directed to designated areas in the store.

7. Impulse Buying

The convenience to the shopper of having information readily available on certain items for sale will lead to impulse buying.

8. Writing Surface

The flat surface of the unit provides a stable writing area for those who use a shopping list.

9. Improved look

In addition to the benefits mentioned above, the device creates a new look to the grocery cart.

Since various modifications can be made in my invention as hereinabove described, and many apparently widely different embodiments of same made within the spirit and scope of the claims without departing from such spirit and scope, it is intended that all matter contained in the accompanying specification shall be interested as illustrative only and not in a limiting sense.

I claim:

1. A display holder for grocery carts and the like which include a transverse push bar and an upper transverse rod at the rear of the cart body spaced and parallel to the push bar; said display holder comprising in combination a substantially rectangular panel assembly including an upper side and a lower side defining at least one relatively thin recess therebetween opening out onto one longitudinal side of the panel assembly for detachably retaining display means therein, at least the upper side being transparent over the relatively thin recess, means to secure said panel assembly by the one longitudinal side thereof to the push bar of the associated grocery cart and means to secure said panel assembly by the other longitudinal side thereof, to the upper transverse rod at the rear of the cart body, said means to secure said panel assembly to the push bar of the associated cart including at least one clamp extending around the push bar and being secured adjacent to one longitudinal edge of the panel assembly.

2. The display holder according to claim 1 in which part of said relatively thin recess also opens out onto the other longitudinal side of the panel assembly.

3. The display holder according to claim 2 in which said panel assembly includes an upper and lower plate secured together by said means to secure said panel assembly to the associated grocery cart.

4. The display holder according to claim 3 in which said lower plate includes a substantially rectangular plate, spacer means extending between the two longitudinally extending sides thereof to define said relative thin recess therebetween, at least one stop member extending upwardly from said lower plate adjacent the said other longitudinally extending side thereof, to limit the position of the associated display means within said recess, the one longitudinal edge of said lower plate extending beyond the one longitudinal edge of the other plate and being bevelled outwardly and downwardly across said recess.

5. The display holder according to claim 4 in which said means to secure said panel assembly to the upper transverse rod of the cart body includes at least one clamp extending around the upper transverse rod, an apertured resilient spacer also extending around said upper transverse rod, said clamp extending through said aperture in said spacer and being secured to the other longitudinal edge of said panel assembly.

6. The display holder according to claim 3 in which said means to secure said panel assembly to the upper transverse rod of the cart body includes at least one clamp extending around the upper transverse rod, an apertured resilient spacer also extending around said upper transverse rod, said clamp extending through said aperture in said spacer and being secured to the other longitudinal edge of said panel assembly.

7. The display holder according to claim 2 in which said means to secure said panel assembly to the upper transverse rod of the cart body includes at least one clamp extending around the upper transverse rod, an apertured resilient spacer also extending around said upper transverse rod, said clamp extending through said aperture in said spacer and being secured to the other longitudinal edge of said panel assembly.

8. The display holder according to claim 1 in which said panel assembly includes an upper and lower plate secured together by said means to secure said panel assembly to the associated grocery cart.

9. The display holder according to claim 8 in which said lower plate includes a substantially rectangular plate, spacer means extending between the two longitudinally extending sides thereof to define said relatively thin recess therebetween, at least one stop member extending upwardly from said lower plate adjacent the said other longitudinally extending side thereof, to limit the position of the associated display means within said recess, the one longitudinal edge of said lower plate extending beyond the one longitudinal edge of the other plate and being bevelled outwardly and downwardly across said recess.

10. The display holder according to claim 9 in which said means to secure said panel assembly to the upper transverse rod of the cart body includes at least one clamp extending around the upper transverse rod, an apertured resilient spacer also extending around said upper transverse rod, said clamp extending through said aperture in said spacer and being secured to the other longitudinal edge of said panel assembly.

11. The display holder according to claim 8 in which said means to secure said panel assembly to the upper transverse rod of the cart body includes at least one clamp extending around the upper transverse rod, an apertured resilient spacer also extending around said upper transverse rod, said clamp extending through said aperture in said spacer and being secured to the other longitudinal edge of said panel assembly.

12. The display holder according to claim 1 in which said means to secure said panel assembly to the upper transverse rod of the cart body includes at least one clamp extending around the upper transverse rod, an apertured resilient spacer also extending around said upper transverse rod, said clamp extending through said aperture in said spacer and being secured to the other longitudinal edge of said panel assembly.

* * * * *